March 15, 1932. H. A. DENMIRE 1,849,139
PNEUMATIC TIRE PRESSURE INDICATOR SYSTEM
Filed Oct. 2, 1926 3 Sheets-Sheet 1

Inventor.
Harold A. Denmire
by Evans & McCoy
Attorneys.

March 15, 1932.   H. A. DENMIRE   1,849,139

PNEUMATIC TIRE PRESSURE INDICATOR SYSTEM

Filed Oct. 2, 1926   3 Sheets-Sheet 3

Inventor
Harold A. Denmire
by Evans & McCoy
Attorneys

Patented Mar. 15, 1932

1,849,139

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

PNEUMATIC TIRE PRESSURE INDICATOR SYSTEM

Application filed October 2, 1926. Serial No. 139,055.

This invention relates to pressure indicating systems and particularly to means for indicating the pressures in pneumatic tires of a vehicle during operation of the vehicle and the like.

One of the objects of the invention is to provide a pressure indicating mechanism that will transmit fluid pressure indications from a moving part to a stationary part of a machine.

Another object of the invention is to provide a reliable and reasonably accurate pneumatic tire pressure indicator that may be carried on the instrument board of a vehicle and that will indicate the inflation pressures of different vehicle tires during operation of the vehicle.

An additional object of the invention is to maintain the same inflation pressure in a pair of dual-mounted pneumatic tires when the inflation pressure of the tires is above a predetermined desired safe operating pressure and to cut off communication between the tires if the pressure drops below a desired minimum operating pressure.

Another object of the invention is to provide a single indicator that will satisfactorily indicate the inflation pressures in a pair of dual-mounted tires.

Another object of the invention is to provide a hydrostatic pressure indicating mechanism that will be substantially free from errors due to variations in the operating temperature of the device.

Pneumatic tire indicators adapted for mounting on the dash of a vehicle have heretofore been proposed. Applicant's invention differs from previously proposed methods of remotely indicating the pressure of the tires, or other relatively rotating bodies, by providing a transmission of the inflation pressures to the indicating device without substantial movement of the communicating parts rather than transmitting the pressure indications by the proportionate movement of parts of the device. In prior structures with which applicant is familiar, such for instance as structures that depend upon the relative movement of the parts for indications, unsatisfactory operation results from temperature variations and errors in mechanical connections of the indicator parts.

Particular adaptations of the invention to single and to dual-mounted pneumatic tires are shown in the accompanying drawings wherein.

Figure 1:
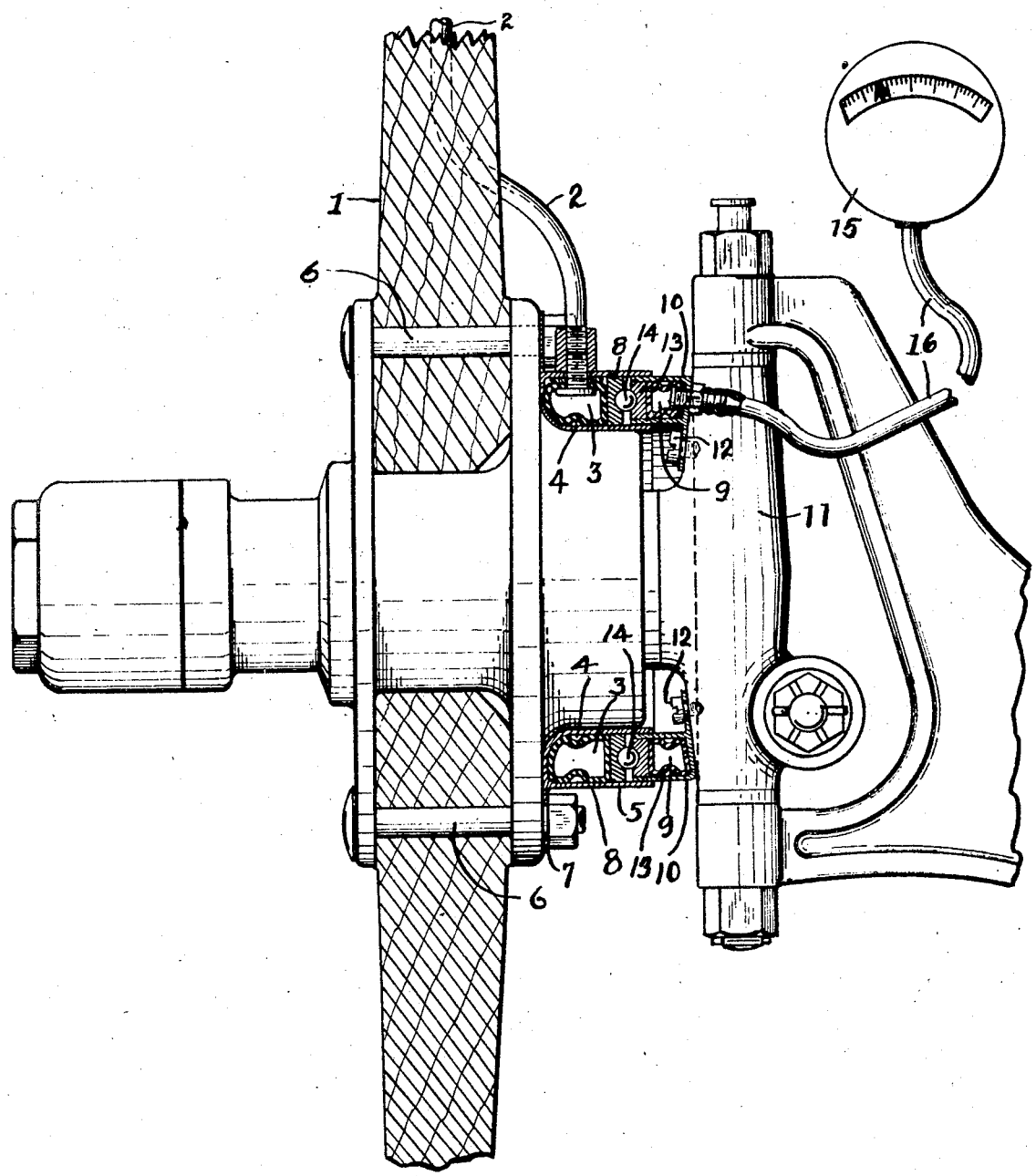
Fig. 1 is a vertical sectional view of one of the steering wheels of an automotive vehicle showing a preferred application of the invention.

Fig. 1 shows an application of the invention to a single vehicle tire carried on one of the front steering wheels 1 of an automotive vehicle. In this installation, a pressure tube 2 that is in open communication with a vehicle tire carried on the wheel 1, serves to maintain a pressure the same as the tire inflating pressure within the pressure ring 3 that is carried by the wheel 1.

The circumferential folds 4 of the pressure ring 3 provide a bellows-like fold in the ring that permits its lateral extension in an axial direction with very little frictional resistance and also with little resistance from tension in the walls of the pressure ring.

The distensible pressure ring 3, which is preferably made of rubber or rubber and fabric with circumferential folds 4 extending around its inner and outer circumference, is carried in an annular groove that is formed between the concentric side walls of a suitable housing member 5 that is secured in place on the vehicle wheel 1 by the bolts 6 that extend through suitable apertures formed in a flange 7 that is formed on the housing.

The pressure ring 3 acts directly upon one race 8 of a thrust bearing to transmit pressures through the thrust bearing to a second pressure ring 9 that is filled with liquid. The race 8 of the thrust bearing is carried within the grooved housing 5 with sufficiently free working fit to permit lateral motion of the thrust bearing in response to any temperature or mechanical changes in the liquid filled pressure ring 9.

The liquid filled pressure ring 9 is carried within an annular groove that is formed in the open sided annular bracket 10 that is secured to the steering knuckle 11 of the wheel 1 by suitable means such as machine screws 12. The thrust bearing race 13 that opposes the race 8 through a series of ball bearings 14, is also slidably carried in the bracket 10. The bearing race 13 and pressure tube 9 against which it acts are relatively stationary whereas the pressure ring 3 and bearing race 8 turn with the wheel 1. The ball bearings 14 serve to transmit the lateral thrust from the air inflated pressure ring 3 to the liquid filled pressure ring 9. The race members 8 and 13 may be of fibre, metal or other material since the imposed pressure will not be great. If fibre is used, lubrication will be unnecessary. If metal is used it may be desirable to lubricate the parts with some lubricant that is not harmful to rubber or such other material as the pressure rings 3 and 9 are made from.

The liquid filled pressure ring 9 communicates with an indicating instrument 15 of any suitable character, through a flexible liquid filled tube 16 that extends from the vehicle wheel to any suitable mounting place for the indicator 15.

The operation of this device will be readily understood. The thrust that is imposed on the moving bearing race 8 by the air inflated pressure ring 3 is directly proportional to the inflating pressure of the tire with which the pressure ring communicates at all times through the tube 2. The thrust bearing in turn transmits this pressure to the liquid filled pressure ring 9 which communicates directly with the indicator 15 through tubular connection 16. The indicator dial is calibrated to show tire pressures directly thereon.

The liquid filled pressure ring 9 and indicator connections are responsive to minute movement of the bearing race 13 because of the incompressible nature of the liquid contained therein. On the other hand the air filled pressure ring 3 is readily extensible and it will cause the bearing race 8 to follow up any relative lateral movement of the bearing race 13 to maintain the same pressure on the bearing race 13 regardless of movements therein that may be caused by loose mechanical parts or by temperature changes in the volume of liquid in the system. For these reasons the indications of the instrument will be substantially free from temperature variations and loose mechanical connections.

Figure 2:
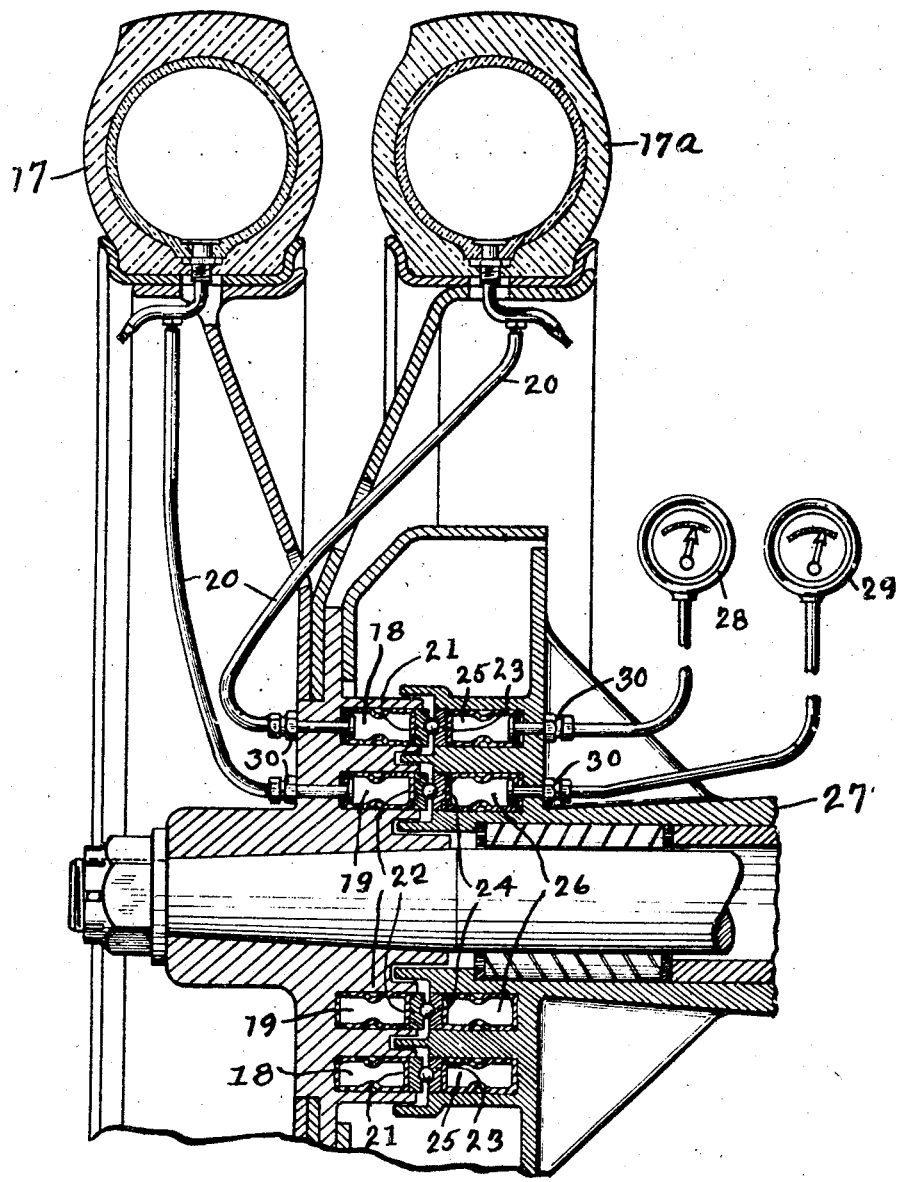
Fig. 2 is a vertical sectional view taken substantially through the axis of the vehicle wheel, showing an application of the invention to dual-mounted tires to separately indicate the pressure in each of the tires.

The application of the invention to dual-mounted tires in which separate indication is desired for each tire is shown in Fig. 2.

This structure comprises a pair of pneumatic vehicle tires 17 and 17a that are respectively connected to an independent pair of concentrically mounted pressure rings 18 and 19 through tubes 20 that enter the respective valve stems of the tires to provide a permanently open connection between the respective tires and the corresponding pressure ring.

The pressure rings 18 and 19 are carried in suitable concentric spaced annular grooves that are formed in the side wall of the body of the wheel hub. The side walls of the annular grooves or recesses are sufficiently wide to support the thrust bearing race members 21 and 22 that oppose corresponding race members 23 and 24 of opposite thrust and that are interposed between the air filled pressure rings 18 and 19 and the liquid filled pressure rings 25 and 26 respectively, carried by the stationary vehicle housing 27. An indicator 28 is connected to the liquid filled pressure ring 25 and an indicator 29 is connected to the pressure ring 26 to indicate the inflation pressure of each tire.

Although the annular grooves in which the pressure rings are mounted are formed respectively in the housing and wheel hub in this device, it will be apparent that they could also be formed in separate mountings.

The operation of each of the indicators 28 and 29 is the same as the operation of the previously described indicator. The concentric mounting of the sets of pressure rings and thrust bearing units renders it convenient to mount as many separate indicators on an individual wheel, or other moving part, as is desired. The fluid connections 30 to the pressure rings are also simplified by carrying the connections from the tube in an axial direction.

Figure 3:
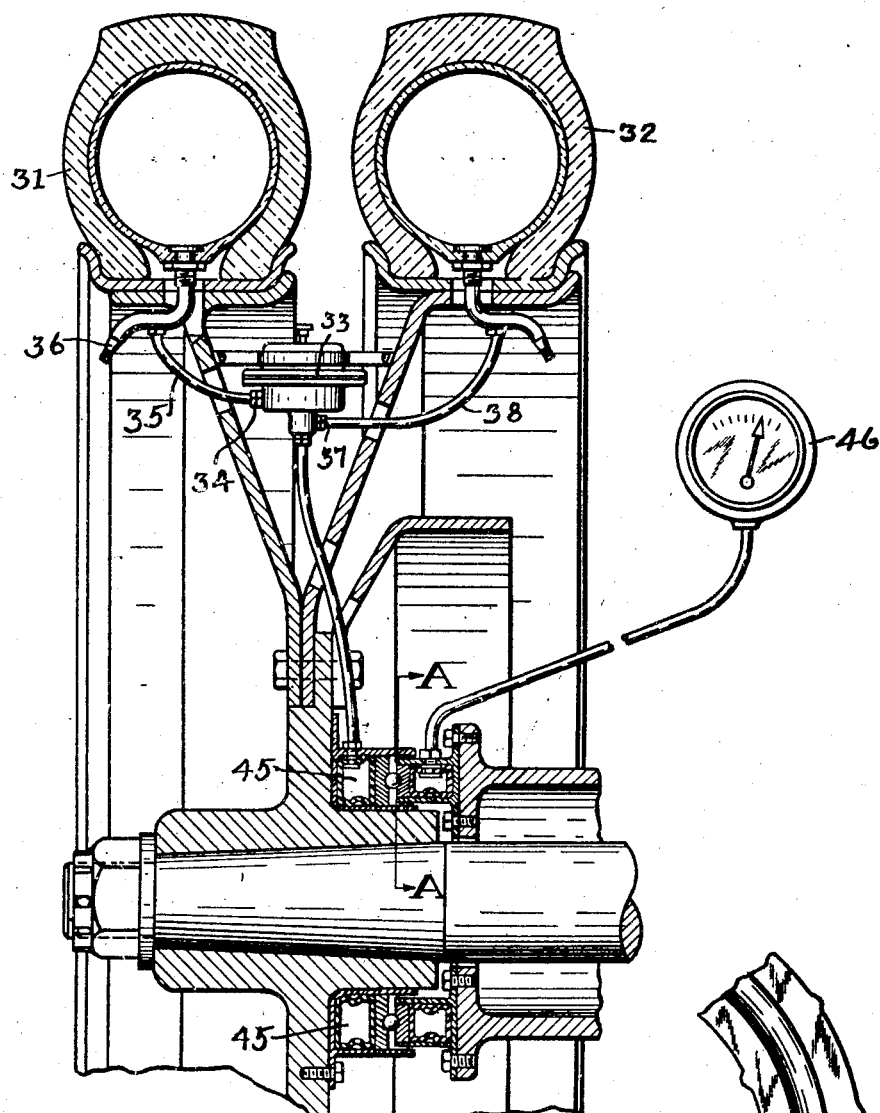
Fig. 3 is a vertical sectional view, taken substantially through the axis of a vehicle wheel, showing one indicator used to indicate the pressure in communicating dual-mounted tires.
Figure 5:
Fig. 5 is an enlarged face view, with parts broken away, of one of the races of a thrust bearing used in connection with the invention.
Figure 4:
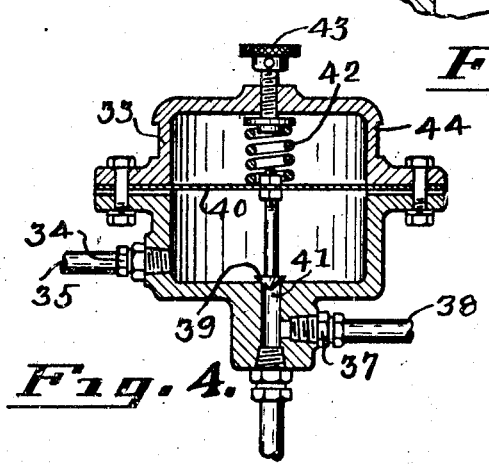
Fig. 4 is an enlarged vertical sectional view of a valve device that is adapted to maintain open pressure communication between the pair of dual-mounted tires shown in Fig. 3 when the pressure is above a predetermined value and that cuts off communication between the tires when the pressure of either tire drops below a predetermined safe operating value.

Fig. 3, Fig. 4 and Fig. 5 show an application of the invention to dual-mounted tires that are connected for the transmission of inflating pressure from each to the other in order to maintain uniform inflation in both tires. Dual-mounted tire 31 connects with tire 32 through a pressure equalizing valve 33. Port 34 is connected to tire 31 through the tube 35 that is connected to a base portion of the valve stem 36 for convenience. Port 37 connects with tire 32 through the tube 38. A valve head 39, that is actuated by a pressure controlled diaphragm 40 to open and close valve port 41, is carried by the diaphragm. A helical spring 42, which can be adjusted to regulate the pressure at which the valve 39 closes by turning a knurled thumb screw 43, is carried in the upper casing portion 44. The valve port 41 is connected to tire 32 and also to the pressure ring 45 of the indicator mechanism. This is substantially the same as the indicator mechanism described in connection with Fig. 1 except that it is mounted on a rear vehicle wheel instead of a front steering wheel. The pressure indicator 46 is mounted on any convenient part of the vehicle and adapted to indicate both tire pressures so long as the valve 33 remains open and to indicate the pressure of tire 32 in the event that the valve head 39 closes the port 41 to thereby cut off communication between the two tires.

As previously set forth, the operation of the pressure regulator valve 33 is manually adjustable to insure cutting off communication between the tires at any desired minimum pressure. It is desired that this pressure be a safe operating pressure for the tire in order that if one tire is punctured, the other tire may serve to support the vehicle until a repair station is reached. The indication on the instrument dial of the minimum pressure indicates that the tires require immediate attention.

If a puncture occurs in tire 32 during operation the leakage of pressure from this tire will reduce the inflating pressure to a point where the spring 42 will overcome the pressure of the diaphragm 40 and close communication between the tires. Additional leakage of pressure from tire 32 will then be indicated on the gauge 46 although tire 31 is cut off from communication with tire 32 and maintained at a safe operating inflation. On the other hand, if a puncture occurs in tire 31, the reduction of pressure on diaphragm 40 will cut off communication between the tires at the minimum permissible operating pressure for the dual tire. The instrument indication will then be substantially constant at the safe minimum operating value although one tire is deflated. The indication of a minimum permissible pressure on the gauge will at once tell the operator that the outside tire is probably punctured and attention can immediately be given to it. It will be noted, however, that the device prevents the deflation of both tires on one wheel when a puncture is received in one of them, although communication between the two tires is maintained when the pressure in the two tires exceeds the minimum safe operating value.

It will also be apparent that the two tires 31 and 32 can both be inflated from the same outside valve 36 because the inflation pressure will maintain the communication valve 33 open between them.

If desired, the instrument 46 or any of the other illustrated indicators could be of the recording type and adapted to provide a permanent record of the inflation pressures at which the tires of the vehicle are operated.

This would be very useful in checking the operation of tires in taxi service and the like where tires are often irreparably damaged by operation at under inflation. The knowledge that permanent record was being kept of the operating pressure of the tires would insure careful attention on the part of the operators and also would insure more informative service tests of tires.

It will be obvious from a consideration of the invention as herein described that various modifications can be made in the application of the invention to different mechanisms without departing from the spirit thereof. It will also be apparent that the invention is adapted for use in the transmission of one or more independent pressure indications from any rotating body to its associated relatively stationary body.

What I claim is:

1. A pressure system for an automotive vehicle equipped with pneumatic tires comprising a pair of opposed thrust bearing raceways, one of which is carried by and rotatable with the vehicle wheel, an elongated hollow pressure operated member that is connected with the pneumatic tire mounted on said wheel and adapted to transmit pressure to said raceway, a second hollow pressure operated hydrostatic member carried by the axle for said wheel and having a raceway adapted to oppose the raceway carried by the wheel and to establish communication therebetween that is responsive to pressure within said tire, and a pressure indicator controlled from said raceway carried by the wheel.

2. The combination with an automotive vehicle having pneumatic tires thereon, of an inflation pressure indicating device associated with one of said tires comprising an elongated laterally extensible hollow member subjected to the fluid pressure in one of said tires, a thrust bearing race adapted to receive the lateral pressure from said extensible member, said bearing race and said extensible member being carried by said wheel, a second bearing race opposing the first race and adapted to receive thrust pressures therefrom, a hollow liquid filled pressure responsive member connected with the second race and adapted to transmit pressures therefrom to a suitable pressure indicating instrument, and a pressure indicating instrument connected with said liquid filled pressure responsive member.

3. The combination with an automotive vehicle having pneumatic tires thereon, of an inflation pressure indicating device comprising an extensible hollow inflatable member carried by one of the wheels of the vehicle in open communication with one of said tires, a second hollow liquid filled extensible member carried by the support for said wheel, a thrust bearing interposed between the extensible member carried by the support for said wheel and the extensible member carried by said wheel, a pressure indicating instrument, and a tube connected between the extensible member carried by the support for said wheel and the indicating instrument, the extensible member carried by the support for said wheel and the tube to the pressure indicating instrument being filled with liquid.

4. A pressure indicating device for use in transmitting pressure indications from a rotating body to a support for the rotating body comprising an extensible hollow annular member carried by the rotated body and subjected to the fluid pressure to be indicated, a thrust bearing acted upon by the fluid pressure in said extensible annular member, a second hollow extensible member carried by the support and filled with liquid acted upon by the thrust bearing, and pressure indicating means connected with the second extensible device and acted upon by liquid pressures therein.

5. A pressure indicating device for use in transmitting pressure indications from a rotating body to a support for the rotating body comprising an extensible hollow annular member carried by the rotated body and subjected to the fluid pressure to be indicated, a second hollow annular extensible member carried by the support and filled with liquid, a pressure indicating instrument in open communication with the liquid filled extensible chamber and acted upon by liquid pressures therein, a thrust bearing interposed between said extensible members adapted to transmit thrust from the first extensible member to the second extensible member that is substantially proportionate to the fluid pressure to be indicated, each extensible member being of substantially the same diameter and arranged concentrically of the axis of rotation of said rotating body.

6. The combination with an automotive vehicle having a pair of dual-mounted pneumatic tires carried on one wheel thereof, of a ported valve mechanism having one port communicating with one of the tires and a second port communicating with the other tire, a diaphragm subjected to the pressure of one tire, and a valve actuated by said diaphragm to cut off communication between said ports when the pressure in one of said tires decreases to a predetermined minimum value, and a pressure indicating system for use therewith comprising an extensible hollow ring carried by the wheel and in open communication with one of the tires, a second hollow liquid filled extensible ring carried by the support for the wheel, a thrust bearing interposed between the extensible members to transmit pressure therebetween, and a pressure operated indicator connected with the second extensible ring and acted upon by liquid pressures therein.

In testimony whereof I affix my signature.

HAROLD A. DENMIRE.